(12) United States Patent
Morishima

(10) Patent No.: US 8,753,769 B2
(45) Date of Patent: Jun. 17, 2014

(54) METHOD FOR MANUFACTURING SECONDARY BATTERY

(75) Inventor: Ryuta Morishima, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 491 days.

(21) Appl. No.: 12/681,897

(22) PCT Filed: Sep. 22, 2008

(86) PCT No.: PCT/JP2008/067116
§ 371 (c)(1),
(2), (4) Date: Apr. 7, 2010

(87) PCT Pub. No.: WO2009/047976
PCT Pub. Date: Apr. 16, 2009

(65) Prior Publication Data
US 2010/0216019 A1 Aug. 26, 2010

(30) Foreign Application Priority Data
Oct. 12, 2007 (JP) ................................. 2007-267245

(51) Int. Cl.
*H01M 10/26* (2006.01)
(52) U.S. Cl.
USPC ........................................ 429/207; 29/623.1
(58) Field of Classification Search
USPC ........................................ 429/207; 29/623.1
See application file for complete search history.

(56) References Cited

U.S. PATENT DOCUMENTS

| 2002/0004170 | A1* | 1/2002 | Munakata et al. | .......... 429/231.1 |
| 2006/0248710 | A1* | 11/2006 | Fukumoto et al. | .......... 29/623.5 |
| 2010/0190063 | A1* | 7/2010 | Fukumoto et al. | ............ 429/246 |

FOREIGN PATENT DOCUMENTS

| CN | 2594997 | 12/2003 |
| JP | 2-210769 | 8/1990 |
| JP | 4-206167 | 7/1992 |
| JP | 2003-7332 | 1/2003 |
| JP | 2005-56609 | 3/2005 |
| JP | 2005-228511 | 8/2005 |
| JP | 2005-327592 | 11/2005 |

OTHER PUBLICATIONS

Office Action for KR Appl. No. 10-2010-7007635 dated Dec. 21, 2011.
First Notice of Grounds for Rejection for Chinese Appl. No. CN 200880111141.3 dated May 24, 2012.

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

Disclosed is a method for manufacturing a secondary battery (10) containing a nonaqueous electrolyte solution. This method comprises a step (S110) for preparing an electrode assembly (20) having positive and negative electrode sheets (30, 40), a step (S120) for immersing the electrode assembly (20) into a nonaqueous liquid (60), and a step (S130, S140) for placing the electrode assembly (20) after immersion into a battery container (11) together with a nonaqueous electrolyte solution (70). By performing the immersion process, the water content in the electrode assembly (20) moves into the nonaqueous liquid (60).

6 Claims, 8 Drawing Sheets

METHOD FOR MANUFACTURING SECONDARY BATTERY

TECHNICAL FIELD

The present invention relates to a method for manufacturing secondary batteries such as a lithium ion secondary battery comprising a nonaqueous electrolyte solution.

This application claims priority based on Japanese Patent Application No. 2007-267245 filed on Oct. 12, 2007, and the entire disclosure thereof is hereby incorporated herein by reference.

BACKGROUND ART

The demand for secondary batteries such as lithium ion secondary batteries that are lightweight and have high output is expected to rise steadily as power supplies installed in vehicles and as power supplies for personal computers and mobile terminals. A typical example of such secondary batteries is one in which positive and negative electrode sheets are laminated into an electrode assembly, which is housed in a battery container along with a nonaqueous electrolyte solution. Patent Document 1 is given here as an example of a prior art publication related to this type of nonaqueous electrolyte solution secondary battery.

Patent Document 1: Japanese Patent Application Laid-Open No. 2005-228511

DISCLOSURE OF THE INVENTION

With a secondary battery comprising a nonaqueous electrolyte solution (such as lithium ion secondary battery), the amount of water in the battery container is preferably kept low in order to improve the battery performance (output characteristics, capacity maintenance characteristics, etc.). Patent Document 1 discusses keeping the water content in a battery to within a specific low range by managing the moisture in the atmosphere (such as using dry air) during the storage of the parts that make up the battery or during battery assembly (paragraph 0087 in Patent Document 1). It would be beneficial if a more effective method could be provided for manufacturing a nonaqueous electrolyte solution secondary battery in which the water content in the battery container is kept low.

It is an object of the present invention to provide a method for manufacturing a secondary battery such as a lithium ion secondary battery in which the water content in the battery container is kept low. It is another object of the present invention to provide a vehicle equipped with such a secondary battery.

The present invention provides a method for manufacturing a secondary battery (such as a lithium ion secondary battery) comprising a nonaqueous electrolyte solution. This method includes a step of preparing (manufacturing, procuring, etc.) an electrode assembly having positive and negative electrode sheets. It also includes a step of immersing said electrode assembly into a nonaqueous liquid. It further includes a step of placing the electrode assembly that has undergone the immersion treatment into a battery container along with a nonaqueous electrolyte solution.

The electrode assembly having sheet-form electrodes (electrode sheets) (such as a wound electrode assembly in which positive and negative electrode sheets are laminated and wound, or a laminated electrode assembly in which a plurality of positive and negative electrode sheets are alternately laminated) is such that the electrode sheets have a large surface area. Accordingly, a relatively large quantity of water tends to be adsorbed, and furthermore, removing this adsorbed water was difficult or troublesome with prior art. With the manufacturing method of the present invention, even though the electrode assembly is made using electrode sheets, any water or the like had by the electrode assembly (such as water adsorbed to the electrode assembly) can be quickly moved (i.e., removed from the electrode assembly) to the nonaqueous liquid by performing the above-mentioned immersion treatment. A battery in which very little water is present in the battery container can be efficiently manufactured by housing an electrode assembly from which water has thus been removed in the battery container. Because it has a low water content, such a battery undergoes less self-discharge, which means that superior battery performance can be obtained (output characteristics, capacity maintenance characteristics, etc.).

The term "secondary battery" as used in this specification refers generally to a storage device that can be repeatedly charged, and encompasses lithium ion secondary batteries, nickel-hydrogen batteries, nickel-cadmium batteries, and other so-called storage batteries, as well as electric double layer capacitors and other such electrical storage elements.

A nonaqueous liquid that contains at least one type of nonaqueous solvent serving as the constituent component of a nonaqueous electrolyte solution used in the secondary battery to be manufactured can be used favorably as the nonaqueous liquid used in the above-mentioned immersion treatment. This nonaqueous liquid may be a nonaqueous liquid in which all types of nonaqueous solvent contained in the nonaqueous electrolyte solution are contained in substantially the same compositional ratio as in the electrolyte solution (such as a nonaqueous liquid corresponding to a composition in which supporting salts have been removed from the above-mentioned electrolyte solution), or may be a nonaqueous liquid with substantially the same composition as the above-mentioned electrolyte solution (typically with a composition that includes a supporting salt).

With this method, a battery with a low water content can be efficiently manufactured by placing the electrode assembly in the battery container while the nonaqueous liquid from the immersion treatment is still clinging (without requiring any extra steps such as rinsing off the nonaqueous liquid clinging to the electrode assembly and drying).

In the above mode in which the electrode assembly is immersed in a nonaqueous liquid containing at least one type of nonaqueous solvent serving as a constituent component of the nonaqueous electrolyte solution, the nonaqueous liquid used for the immersion treatment can be subjected to a suitable treatment (water removal) to reduce the amount of water contained in the nonaqueous liquid (typically, this is mainly the water that has moved from the electrode assembly in the immersion treatment), and then can be used favorably as the nonaqueous electrolyte solution contained in the secondary battery to be manufactured, or as a constituent component thereof. With this mode, a nonaqueous liquid that has undergone the above-mentioned water removal treatment can be effectively utilized as the electrolyte solution or as a constituent component thereof. Therefore, the amount of waste liquid is reduced and there is less impact on the environment, while a battery with a low water content can be manufactured efficiently. A treatment in which a voltage of at least the hydrolysis voltage (about 1.2 V) (typically the voltage is about 1.2 to 4 V, and preferably about 1.5 to 4 V, such as about 2 to 3 V) is applied to the nonaqueous liquid can be used favorably as the above-mentioned water removal treatment.

The secondary battery manufacturing methods disclosed herein can be used favorably to manufacture a lithium ion secondary battery. They are particularly favorable as methods for manufacturing a lithium ion secondary battery comprising a nonaqueous electrolyte solution with a composition that includes a lithium salt (supporting salt) in which fluorine is a constituent element. With this lithium ion secondary battery manufacturing method, a liquid containing a lithium salt in which fluorine is a constituent element (hereinafter also referred to as a "fluorine-containing lithium salt") can be used favorably as the nonaqueous liquid in which the electrode assembly is immersed. The method further includes a step of applying a voltage of at least 2 V to the nonaqueous liquid after the immersion of the electrode assembly, and the nonaqueous electrolyte solution obtained using the nonaqueous liquid after the electricity application treatment is placed in the battery container.

With this method, since the amount of water contained in the nonaqueous liquid after the electrode assembly immersion is reduced by the above-mentioned voltage application treatment, the above-mentioned nonaqueous liquid can be used effectively as the electrolyte solution or as a constituent component thereof. Therefore, the amount of waste liquid is reduced and there is less impact on the environment, while a battery with a low water content can be manufactured efficiently. Also, a reaction between the fluorine-containing lithium salt and the water contained in the nonaqueous liquid after the electrode assembly immersion (typically, this is mainly the water that has moved from the electrode assembly in the immersion treatment) may produce a reaction product (such as a fluorophosphate of lithium) that contributes to a decrease in the potential of the electric double layer formed at the interface between the electrode active material and the nonaqueous electrolyte solution. The above-mentioned decrease in the potential of the electric double layer is favorable because it suppresses an increase in internal resistance of the battery, and in turn leads to higher output (such as low-temperature output). Therefore, with the above-mentioned mode in which a nonaqueous liquid containing the above-mentioned reaction product is utilized as the nonaqueous electrolyte solution or a constituent component thereof, this combines with the effect of reducing the water content in the battery container, and allows a battery with higher performance to be manufactured efficiently. Also, it is preferable for the voltage applied in the above-mentioned voltage application treatment to be at least 2 V (typically, about 2 to 4 V, such as about 2 to 3 V), because this allows the hydrogen fluoride (HF) that may be produced by a reaction between water and the fluorine-containing lithium salt to be electrolyzed.

Lithium hexafluorophosphate ($LiPF_6$) can be used favorably as the above-mentioned fluorine-containing lithium salt. If the above-mentioned voltage application treatment is performed on a nonaqueous liquid containing water and lithium hexafluorophosphate, the result is a reaction product that contributes particularly well to higher output (more specifically, a fluorophosphate of lithium). Therefore, in the above-mentioned mode in which a nonaqueous liquid containing the above-mentioned reaction product is utilized as the nonaqueous electrolyte solution or a constituent component thereof, a lithium ion secondary battery with particularly good output characteristics can be manufactured.

The present invention provides a method for manufacturing a lithium ion secondary battery comprising a nonaqueous electrolyte solution that contains a fluorine-containing lithium salt. This method involves the preparation (manufacturing, procuring, etc.) of positive and negative electrode sheets. It also involves applying a voltage of at least 2 V to a nonaqueous liquid containing the above-mentioned lithium salt and a nonaqueous solvent. It further involves placing a nonaqueous electrolyte solution made using the nonaqueous liquid that has undergone the voltage application treatment in a battery container along with the electrode assembly (may be an electrode assembly that has been immersed in the above-mentioned nonaqueous liquid).

With this method, any water that may be contained in the nonaqueous liquid (this could be water that has been admixed (or remains) during the manufacture of the nonaqueous liquid or a constituent component thereof, water absorbed during the storage of the nonaqueous liquid or a constituent component thereof, etc.) is electrolyzed by the above-mentioned voltage application treatment, which reduces the water content of the nonaqueous liquid. After it has undergone this voltage application treatment (which can be understood as a treatment for removing water from the nonaqueous liquid), the nonaqueous liquid is used in an electrolyte solution or a constituent component thereof to construct a lithium ion secondary battery, which allows a battery with a low water content to be manufactured efficiently.

Also, a reaction between the fluorine-containing lithium salt and the water contained in the nonaqueous liquid may produce a reaction product that contributes to a decrease in the potential of the electric double layer formed at the interface between the electrode active material and the nonaqueous electrolyte solution. The above-mentioned decrease in the potential of the electric double layer is favorable because it suppresses an increase in internal resistance of the battery, and in turn leads to higher output. Therefore, with the above-mentioned mode in which a nonaqueous liquid containing the above-mentioned reaction product is utilized as the nonaqueous electrolyte solution or a constituent component thereof, this combines with the effect of reducing the water content in the battery container, and allows a battery with higher performance to be manufactured efficiently. A mode in which the above-mentioned lithium salt is lithium hexafluorophosphate is preferable because a lithium ion secondary battery with particularly good output characteristics can be manufactured. Also, the voltage applied in the voltage application treatment is preferably at least 2 V (typically about 2 to 4 V, such as about 2 to 3 V) because the hydrogen fluoride (HF) that may be produced by a reaction between water and the fluorine-containing lithium salt can be electrolyzed.

With any of the methods disclosed herein, a secondary battery (such as a lithium ion secondary battery) in which the amount of water in the battery container is kept low can be manufactured. Such a secondary battery will exhibit good battery performance (output characteristics, capacity maintenance characteristics, etc.), and therefore can be used to advantage as a secondary battery that is installed in a vehicle. It is particularly favorable as a battery used as a power supply for vehicles equipped with an electric motor, such as hybrid vehicles and electric vehicles. Therefore, the present invention provides a vehicle (such as an automobile) equipped with a battery manufactured by any of the methods disclosed herein.

BEST MODE FOR CARRYING OUT THE INVENTION

Preferred embodiments of the present invention will now be described. Matters that are necessary to the working of the present invention but are not specifically mentioned in this Specification can be interpreted to be design matters for a person skilled in the art on the basis of prior art in this field. The present invention can be worked on the basis of what is disclosed in this Specification and common technical knowledge in this field.

Figure 11:
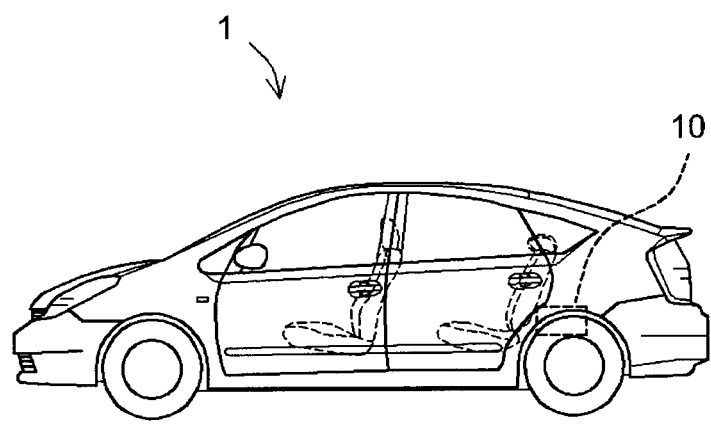
FIG. 11 is a side view schematically illustrating a vehicle (automobile) equipped with the secondary battery of the present invention.

As mentioned above, a secondary battery manufactured by a method disclosed herein exhibits good battery performance (output characteristics, capacity maintenance characteristics, etc.). For instance, compared to a battery with a higher water content, there is less self-discharge, and therefore the output maintenance performance is superior when the battery is left in a state of not being charged for an extended period. Because of these characteristics, the secondary battery provided by the present invention (with a lithium ion secondary battery being particularly favorable) can be used to advantage as a power supply for a motor installed in an automobile or other such vehicle. Therefore, as schematically illustrated in FIG. 11, the present invention provides a vehicle (typically an automobile, and particularly a hybrid automobile, an electric automobile, a fuel cell automobile, or another such automobile equipped with an electric motor) 1 that is equipped with such a secondary battery 10 (which can be in the form of a battery in which a plurality of the secondary batteries 10 are connected in series) as a power supply.

The teaching disclosed herein can be applied with no particular restrictions to the manufacture of various kinds of secondary battery equipped with a nonaqueous electrolyte solution and an electrode assembly having positive and negative electrode sheets. Application to a lithium ion secondary battery is particularly favorable. Since a lithium ion secondary battery is a secondary battery capable of high output at a high energy density, it can be used favorably as a battery (battery module) installed in a vehicle, for example. There are no particular restrictions on the size or structure of the battery container of this secondary battery (such as a metal case or a laminated film structure), or the structure of the electrode assembly (such as a wound structure or a laminated structure), etc.

Figure 1:
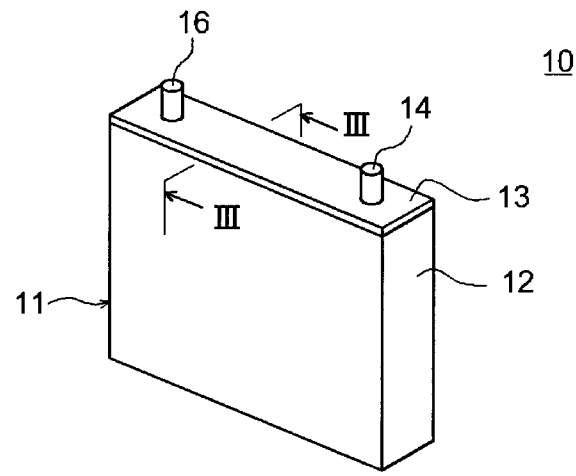
FIG. 1 is an oblique view schematically illustrating a lithium ion secondary battery.
Figure 2:
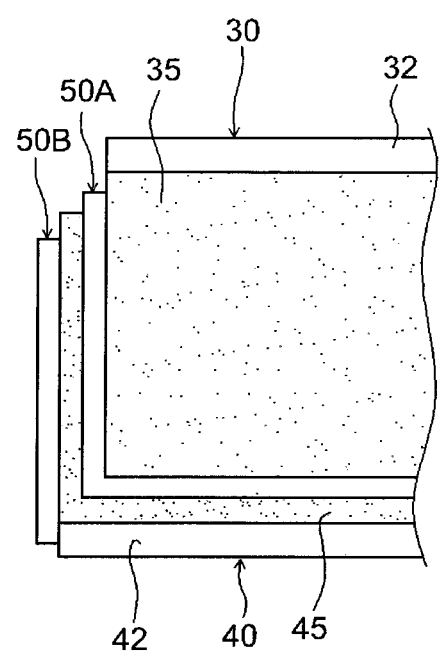
FIG. 2 is a plan view of the positive and negative electrode sheets and separators constituting a wound electrode assembly.
Figure 3:
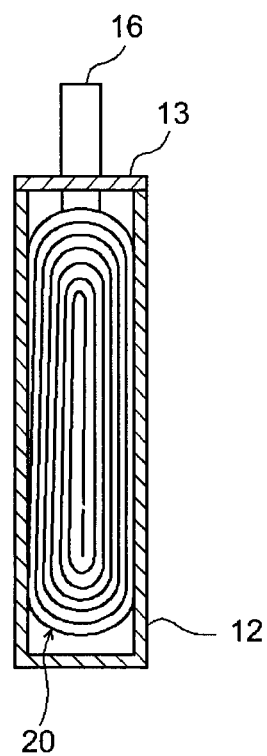
FIG. 3 is a cross section along the III-III line in FIG. 1.

An example of an embodiment of a secondary battery that can be favorably manufactured with the present invention is a lithium ion secondary battery 10 equipped with a wound electrode assembly 20 as schematically illustrated in FIGS. 1 to 3. This lithium ion secondary battery 10 comprises a battery container (outer vessel) 1 made of metal (plastic and laminate film are also favorable). A wound electrode assembly 20 produced by laminating a slender sheet-like positive electrode (positive electrode sheet) 30, a separator 50A, a negative electrode (negative electrode sheet) 40, and a separator 50B in that order, then winding this product into a flattened shape, is housed in this container 1 along with a nonaqueous electrolyte solution.

As shown in FIG. 2, the positive electrode sheet 30 comprises positive electrode collector 32 in the form of a slender sheet, and a positive electrode active material layer 35 formed on the surface thereof. The positive electrode collector 32 can be a sheet material composed of aluminum, nickel, titanium, or another such metal (and is typically aluminum foil or another such metal foil). A layer structure oxide-based positive electrode active material, a spinel structure oxide-based positive electrode active material, or the like that is commonly used in lithium ion secondary batteries can be used favorably as the positive electrode active material that makes up the positive electrode active material layer 35. For example, favorable positive electrode active materials include those whose main component is a lithium-cobalt-based complex oxide (typically $LiCoO_2$), a lithium-nickel-based complex oxide (typically $LiNiO_2$), a lithium-manganese-based complex oxide ($LiMnO_2$), or the like.

In addition to a positive electrode active material, the positive electrode active material layer 35 can also include a binder and a conductive material. The binder here may be any one that has been used to create a secondary battery of this type in the past, favorable examples of which include polyvinylidene fluoride (PVDF), polytetrafluoroethylene (PTFE), polyvinylidene fluoride-hexafluoropropylene copolymer (PVDF-HFP), styrene butadiene rubber (SBR), and carboxymethyl cellulose (CMC). The conductive material can be various forms of carbon black (acetylene black, furnace black, ketjen black, etc.), graphite powder and other carbon powders, nickel powder and other such metal powders, or the like.

A positive electrode sheet 30 configured in this way is typically produced as follows. One of the favorable positive electrode active materials mentioned above is mixed with a suitable conductive material, binder, and water (preferably deionized water) to prepare a composition for forming a positive electrode active material layer (here, a paste-form positive electrode mix of the water kneading type), which is used to coat the surface on both sides of the positive electrode collector 32. Since this coating contains water, the coated product is dried at a suitable temperature (typically 70 to 150° C.) at which the active material will not be modified. This forms the positive electrode active material layer 35 at the desired locations on the surface on both sides of the positive electrode collector 32. As needed, this product is subjected to a suitable pressing treatment (such as roll pressing) to appropriately adjust the thickness and density of the positive electrode active material layer 35. Although there are no particular restrictions, the amount of conductive material used can be between 1 and 20 weight parts (preferably 5 and 15 weight parts) per 100 weight parts of positive electrode active material, for example. The amount of binder used can be from 0.5 to 10 weight parts per 100 weight parts of positive electrode active material, for example.

The negative electrode sheet 40, meanwhile, comprises a negative electrode collector 42 in the form of a slender sheet, and a negative electrode active material layer 45 formed on the surface thereof. The negative electrode collector 42 can be a sheet material composed of copper or another such metal (and is typically copper foil or another such metal foil). A carbon material (carbon particles) in the form of particles at least partially including a graphite structure (layer structure)

can be used favorably as the negative electrode active material that makes up the negative electrode active material layer 45. A carbon material having a graphite structure, a hard carbon structure, a soft carbon structure, or a combination of these structures can also be used favorably. For example, natural graphite, mesocarbon microbeads (MCMB), highly ordered pyrolytic graphite (HOPG), or the like can be used.

A negative electrode sheet 40 configured in this way is typically produced as follows. One of the favorable negative electrode active materials mentioned above is mixed with a binder (the same one as on the positive electrode side can be used) and, if necessary, a conductive material (the same one as on the positive electrode side can be used) to prepare a composition for forming a negative electrode active material layer (here, a paste-form negative electrode mix of the water kneading type), which is used to coat one or both sides of the negative electrode collector 42. The coating is dried at a suitable temperature and this product is subjected as needed to a suitable pressing treatment, which forms a negative electrode active material layer 45 at the desired location on the negative electrode collector 42. Although there are no particular restrictions, the amount of binder used can be from 0.5 to 10 weight parts per 100 weight parts of negative electrode active material, for example.

As shown in FIG. 2, portions where the active material layers 35 and 45 are absent are formed by not coating one end of the positive electrode sheet 30 and the negative electrode sheet 40 in the lengthwise direction with the above-mentioned active material compositions.

Various kinds of porous sheet that are known to be usable in the separators of lithium ion secondary batteries comprising a nonaqueous electrolyte solution can be used as the separators 50A and 50B. For example, a porous resin sheet (film) composed of polyethylene, polypropylene, or another such polyolefin resin can be used favorably. There are no particular restrictions, but an example of a favorable form of the porous sheet (typically a porous resin sheet) is a porous resin sheet having an average porosity of about 0.0005 to 30 μm (and preferably 0.001 to 15 μm) and a thickness of about 5 to 100 μm (and preferably 10 to 30 μm). The porosity of this porous sheet can be about 20 to 90 vol % (and preferably 30 to 80 vol %), for example.

When the positive and negative electrode sheets 30 and 40 are superposed with the two separators 50A and 50B, the positive and negative electrode sheets 30 and 40 are staggered slightly so that, simultaneously with the superposition of the active material layers 35 and 45, the active material layer non-formation part of the positive electrode sheet and the active material layer non-formation part of the negative electrode sheet will be disposed separately at one end in the lengthwise direction and at the other end. In this state, the four sheets 30, 40, 50A, and 50B are wound, and then the wound group is pressed and flattened from the side to obtain a wound electrode assembly 20 with a flat shape.

An example was described above in which water was used as the solvent for the active material layer forming composition (that is, a dispersant of the active material powder, etc.), but the solvent is not limited to being water, and may instead be N-methylpyrrolidone or another such organic solvent, for example. From such standpoints as reducing material expenses, simplifying the equipment, reducing the amount of waste, and making the materials easier to handle, it is usually preferable to use an active material layer forming composition in which the above-mentioned solvent is an aqueous solvent (water, or a mixed solvent whose main component is water). The term "aqueous solvent" as used here refers to water or to a mixed solvent whose main component is water. The solvent other than water that makes up this mixed solvent can be any organic solvent that is uniformly miscible with water (lower alcohols, lower ketones, etc.), one or more of which may be used. Water is a particularly favorable aqueous solvent.

An electrode sheet comprising an active material layer formed from this aqueous composition will tend to adsorb water more readily (the amount of adsorbed water will tend to be greater) than with an electrode sheet formed from an active material layer forming composition in which a solvent whose main component is an organic solvent is used as the above-mentioned solvent (which is called a solvent-based composition). Since a positive electrode active material generally absorbs more water than a negative electrode active material, the above tendency is particularly pronounced in the positive electrode sheet. Therefore, with a structure of a secondary battery comprising an electrode assembly created using electrode sheets (and particularly the positive electrode sheet) having an active material layer formed from an aqueous composition, the effect of applying the present invention, which is to effectively remove water adsorbed to the electrode assembly and thereby suppress how much water gets into the battery container, is manifested particularly well.

The nonaqueous electrolyte solution that is housed in the battery container 11 along with the wound electrode assembly 20 can be an electrolyte solution with any of various compositions commonly used in lithium ion secondary batteries. A typical example of such a nonaqueous electrolyte solution is one that includes a nonaqueous solvent and a lithium salt (supporting salt) that is soluble in that solvent.

Carbonates, esters, ethers, nitriles, sulfones, lactones, or other such aprotic solvents can be used as the above-mentioned nonaqueous solvent. Examples include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone, and other such nonaqueous solvents that are commonly known to be usable for the electrolyte in a lithium ion battery. These can be used singly or in combinations of two or more.

A lithium compound including fluorine as a constituent element (a fluorine-containing lithium salt), such as $LiPF_6$, $LiBF_4$, $LiAsF_6$, $LiCF_3SO_3$, $LiC_4F_9SO_3$, $LiN(CF_3SO_2)_2$, $LiN(C_2F_5SO_2)_2$, or $LiC(CF_3SO_2)_3$, can be used favorably as the above-mentioned supporting salt. Of these, $LiPF_6$ is preferable. Examples of other compounds that can be used as the supporting salt include $LiClO_4$, $LiB[(OCO)_2]_2$, and other such lithium compounds that do not have a fluorine atom.

There are no particular restrictions on the concentration of the supporting salt in the nonaqueous electrolyte, and the concentration can be the same as that of the electrolyte used in a conventional lithium ion secondary battery, for example. Usually, a nonaqueous electrolyte containing a suitable lithium compound (supporting salt) in a concentration of about 0.1 to 5 mol/L (such as about 0.8 to 1.5 mol/L) can be used favorably.

A few preferred modes of manufacturing the lithium ion secondary battery 10 with the configuration shown in FIGS. 1 to 3 by using the wound electrode assembly 20 with the above configuration and applying the invention disclosed herein will now be described through reference to FIGS. 4, 6, and 8. Numerals in parentheses and prefixed by "S" in these drawings have a loose correlation to the step numbers (numerals prefixed by S) in FIGS. 5, 7, and 9, which correspond to battery Manufacturing Examples 1 to 3 (discussed below).

Mode 1

Figure 4:
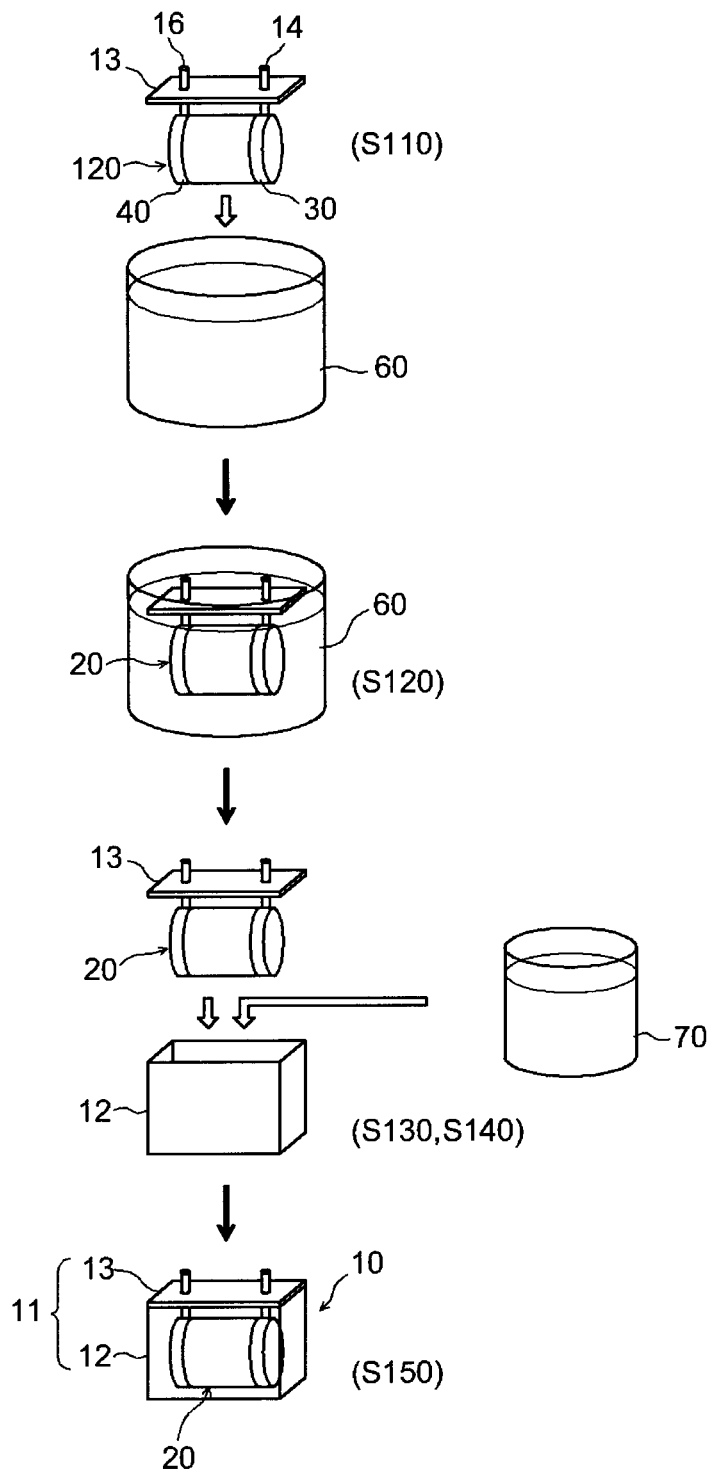
FIG. 4 is a diagram illustrating the key parts of a battery manufacturing method pertaining to Mode 1.

As shown in FIG. 4, an external connection positive electrode terminal 14 (made of aluminum, for example) and an external connection negative electrode terminal 16 (made of copper, for example) that pass through holes in a cover member 13 are respectively joined by welding or another such method to the active material layer non-formation parts of the positive electrode sheet 30 and negative electrode sheet 40 located at the two ends of the wound electrode assembly 20 in the axial direction (step S110). The electrode assembly 20 that has thus been linked to the terminals 14 and 16 and the cover member 13 is immersed in a nonaqueous liquid 60 (step S120). Consequently, water that was adsorbed to the wound electrode assembly 20 is moved to the nonaqueous liquid 60.

A nonaqueous liquid containing one or more kinds of the nonaqueous solvents listed above as examples of constituent components of the nonaqueous electrolyte solution can be used favorably as the nonaqueous liquid here. Specific examples of organic solvents that can be used as a constituent component of the nonaqueous liquid besides the examples listed above include acetone, methyl ethyl ketone, and ethyl acetate.

In a preferred mode, a nonaqueous liquid is used whose composition includes at least one kind of nonaqueous solvent that constitutes a nonaqueous electrolyte solution, according to the composition of the nonaqueous electrolyte solution that is used in the lithium ion secondary battery to be manufactured. For example, as in Example 1 discussed below, if the nonaqueous solvent that makes up the nonaqueous electrolyte solution of the lithium ion secondary battery to be manufactured is composed of ethylene carbonate (EC) and dimethyl carbonate (DMC), then a nonaqueous solvent that is EC alone, or a nonaqueous solvent that is DMC alone (Example 1 below), or a nonaqueous solvent that is a mixed solvent including EC and DMC in the desired weight ratio (preferably substantially the same weight ratio as in the electrolyte solution), can be used favorably as the nonaqueous liquid that is used to immerse the electrode assembly. A nonaqueous liquid obtained by dissolving a compound the same as the supporting salt that makes up the nonaqueous electrolyte solution of the lithium ion secondary battery to be manufactured (typically a lithium salt, and preferably a fluorine-containing lithium salt, and more preferably LiPF$_6$) may be used for this nonaqueous solvent. For example, a nonaqueous liquid with substantially the same composition as the nonaqueous electrolyte solution of the lithium ion secondary battery to be manufactured can be used favorably (Example 3 below).

When the electrode assembly that has been immersed in the above-mentioned nonaqueous liquid is placed in the battery container, some of the nonaqueous liquid may cling to the electrode assembly and be carried into the battery container. If the nonaqueous solvent that makes up the nonaqueous liquid carried into the battery container is a different type of solvent from the nonaqueous solvent that makes up the electrolyte solution, this can cause problems such as the generation of gas inside the battery container. These problems (gas generation, etc.) can be mitigated by using at least one type of nonaqueous solvent that makes up the electrolyte solution used to make the battery as the nonaqueous solvent that makes up the nonaqueous liquid used for the immersion treatment. Therefore, there is no particular need for an extra step (washing, drying, etc.) to reliably remove the nonaqueous liquid clinging to the electrode assembly after the electrode assembly that has been immersed in the nonaqueous liquid has been taken out of the nonaqueous liquid, and a mode in which the electrode assembly is placed in the battery container while the nonaqueous liquid is still clinging to it can be favorably employed. With such a mode, a battery with a low water content can be manufactured efficiently.

The amount of water in the nonaqueous liquid being used (before immersion of the electrode assembly) is preferably about 10 mg/50 mL or less (preferably about 5 mg/50 mL or less). If the water content is too high, there may be a tendency for the effect of removing water from the electrode assembly to be diminished. Methods for obtaining a nonaqueous liquid with the desired water content from a nonaqueous liquid whose water content is too high include a method in which voltage is applied (as discussed below) to electrolyze the contained water, a method in which distillation is performed in the presence of a desiccant such as metallic sodium, a method in which a water adsorbent such as a molecular sieve is added, and other such water removal methods that were known in the past. These can be used singly or in suitable combinations. There are no particular restrictions on the lower limit to the water content, but an example is about 1 mg/50 mL or higher.

The electrode assembly 20 should be immersed in the nonaqueous liquid 60 long enough to reduce the water content of the electrode assembly 20 by moving water that has adsorbed to the electrode assembly 20 into the nonaqueous liquid 60. Usually, good results will be obtained if the immersion treatment time is about at least 30 seconds (preferably about at least 1 minute, and more preferably about at least 5 minutes). There are no particular restrictions on the upper limit to the immersion treatment time, but when productivity is taken into account, about 24 hours or less is usually appropriate, and about 6 hours or less is preferable. This treatment time may be about 2 hours or less (preferably 1 hour or less), for example.

Once the specified immersion treatment time has elapsed, the electrode assembly 20 is taken out of the nonaqueous liquid 60, the electrode assembly 20 that has undergone immersion treatment is placed inside a case 12 through an opening at the top thereof (step S130), and the seam between the case 12 and the cover member 13 is joined by laser welding, for example. Next, a nonaqueous electrolyte solution 70 (may have substantially the same composition as the nonaqueous liquid 60) prepared separately from the above-mentioned nonaqueous liquid is poured into the battery container 11 through a hole (electrolyte solution port; not shown) provided to the cover member 13 (step S140). After this, the electrolyte solution port is closed and the battery container 11 is sealed. This completes the construction (assembly) of a lithium ion secondary battery (battery assembly) 10 (step S150).

The nonaqueous electrolyte solution 70 is preferably one that contains a small amount of water. An electrolyte solution 70 with a water content of about 10 mg/50 mL or less is preferable, and an electrolyte solution 70 with a water content of about 5 mg/50 mL or less is more preferable. If this water content is too high, there may be a tendency for the effect of removing water from the electrode assembly to be diminished. Methods for obtaining a nonaqueous liquid with the desired water content from a nonaqueous liquid whose water content is too high include a method in which voltage is applied (as discussed below) to electrolyze the contained water, a method in which distillation is performed in the presence of a desiccant such as metallic sodium, a method in which a water adsorbent such as a molecular sieve is added, and other such water removal methods that were known in the past. These can be used singly or in suitable combinations.

There are no particular restrictions on the lower limit to the water content, but an example is about 1 mg/50 mL or higher.

With this mode, water adsorbed to the wound electrode assembly 20 can be quickly and thoroughly removed by the above-mentioned immersion treatment. A secondary battery (here, a lithium ion secondary battery) 10 in which there is little water in the battery container (cell) 11 can be efficiently manufactured by placing the electrode assembly 20 from which water has thus been removed in the battery container 11. The secondary battery 10 manufactured in this mode will contain little water that induces self-discharge, and will afford superior battery performance (output characteristics, capacity maintenance characteristics, etc.).

Mode 2

Figure 6:
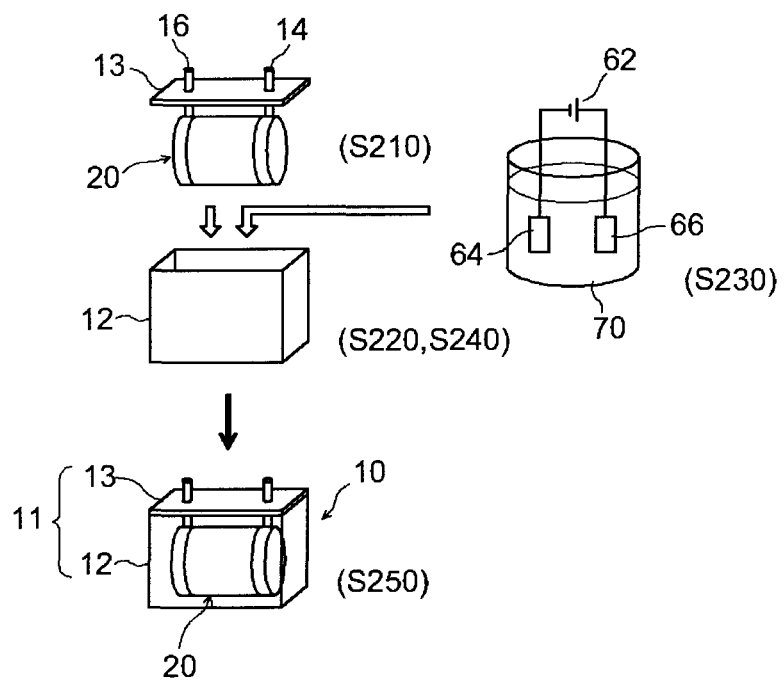
FIG. 6 is a diagram illustrating the key parts of a battery manufacturing method pertaining to Mode 2.

As shown in FIG. 6, just as in Mode 1 above, the electrode assembly 20 is linked to the terminals 14 and 16 and the cover member 13 (step S210). This electrode assembly 20 is placed in the case 12 (step S220), and the case 12 and the cover member 13 are joined.

Meanwhile, a nonaqueous electrolyte solution 70 is prepared that contains lithium hexafluorophosphate ($LiPF_6$) and a nonaqueous solvent. A cathode plate 64 and an anode plate 66 connected to an external power supply 62 are inserted into this nonaqueous electrolyte solution 70, and a voltage of 2 V or more (preferably 2 to 4 V, such as 2.5 V) is applied between the electrode plates 64 and 66 (step S230). A reaction expressed by the following Formula 1 occurs between the $LiPF_6$ and the small amount of water contained in the nonaqueous solvent that is used (typically no more than 10 mg/50 mL, such as about 2 to 5 mg/50 mL) and/or the water ($H_2O$) absorbed from the atmosphere during preparation or storage of the electrolyte solution. This reaction consumes $H_2O$ and reduces the amount of water contained in the form of $H_2O$ in the nonaqueous electrolyte solution 70.

Formula 1

$$2H_2O + LiPF_6 \rightarrow 4HF + LiPO_2F_2 \quad (1)$$

Application of the above-mentioned voltage brings about the reaction expressed by the following Formula 2 on the surface of the cathode plate 64. Since the applied voltage (at least 2 V) is over the decomposition voltage of $H_2O$, any (unreacted) water remaining in the form of $H_2O$ is electrolyzed into oxygen ($O_2$) and hydrogen ($H_2$). This further reduces the water content in the nonaqueous electrolyte solution 70.

Formula 2

$$2HF + 2Li^+ + 2e^- \rightarrow LiF + H_2 \uparrow \quad (2)$$

The reaction expressed by Formula 2 precipitates LiF on the surface of the cathode plate 64. That is, this LiF is removed from the nonaqueous electrolyte solution 70 (liquid phase). Also, the gases ($H_2$ and $O_2$) produced by the electrolysis of $H_2O$ and the reaction expressed by Formula 2 are discharged from the nonaqueous electrolyte solution 70 into the vapor phase. To promote this discharge, a deaeration treatment (defoaming treatment) may be performed in which the nonaqueous electrolyte solution 70 is exposed to a reduced pressure environment. The HF produced by the reaction expressed by Formula 1 is consumed (decomposed) by the reaction expressed by Formula 2. As a result, the above voltage application treatment gives a nonaqueous electrolyte solution 70 that contains $LiPF_6$, a nonaqueous solvent, and a small amount of $LiPO_2F_2$. Because the nonaqueous electrolyte solution 70 thus obtained contains a component that can contribute to raising the battery output ($LiPO_2F_2$), and contains substantially no side-components that could hinder battery performance (LiF and HF), it can be used advantageously as a nonaqueous electrolyte solution in various kinds of secondary battery. Therefore, as another aspect, the invention disclosed herein provides a method for manufacturing (for preparing) a nonaqueous electrolyte solution used as a constituent element of a secondary battery (typically a lithium ion secondary battery).

The nonaqueous electrolyte solution 70 that has undergone the above-mentioned voltage application treatment (containing the $LiPO_2F_2$ produced by the voltage application treatment) is poured into the battery container 11 (step S240). After this, the electrolyte solution port is closed and the battery container 11 is sealed. This completes the construction (assembly) of a lithium ion secondary battery (battery assembly) 10 (step S250).

The materials of the above-mentioned electrode plates 64 and 66 are preferably selected from among materials that are not readily eluted into the nonaqueous electrolyte solution (nonaqueous liquid) when the above-mentioned voltage application (electrolysis) is performed. For example, platinum electrode plates (platinum foils) 64 and 66 can be used to advantage. There are no particular restrictions on how long the voltage is applied, but about 5 minutes or longer (preferably 10 minutes or longer) is usually appropriate. There are no particular restrictions on the upper limit to the voltage application time, but from the standpoints of productivity and energy costs, 6 hours or less is preferable, and 1 hour or less is more preferable.

With this mode, a nonaqueous electrolyte solution 70 containing $LiPO_2F_2$ produced by a reaction between $LiPF_6$ and water is poured into the battery container 11. This $LiPO_2F_2$ ($LiPO_2F_2$ clings to the positive electrode surface, or is present in the electrolyte solution nearby, for example) may lower the potential of the electric double layer formed at the interface between the electrode active material layer (particularly the positive electrode active material layer) and the nonaqueous electrolyte solution 70. This suppresses an increase in internal resistance, and allows the output of the battery 10 to be increased or maintained. With this mode, the effect of reducing the water content in the battery container 11 combines with the effect of $LiPO_2F_2$, and this synergistic effect allows a higher performance battery (a lithium ion secondary battery here) 10 to be manufactured efficiently.

Mode 3

Figure 8:
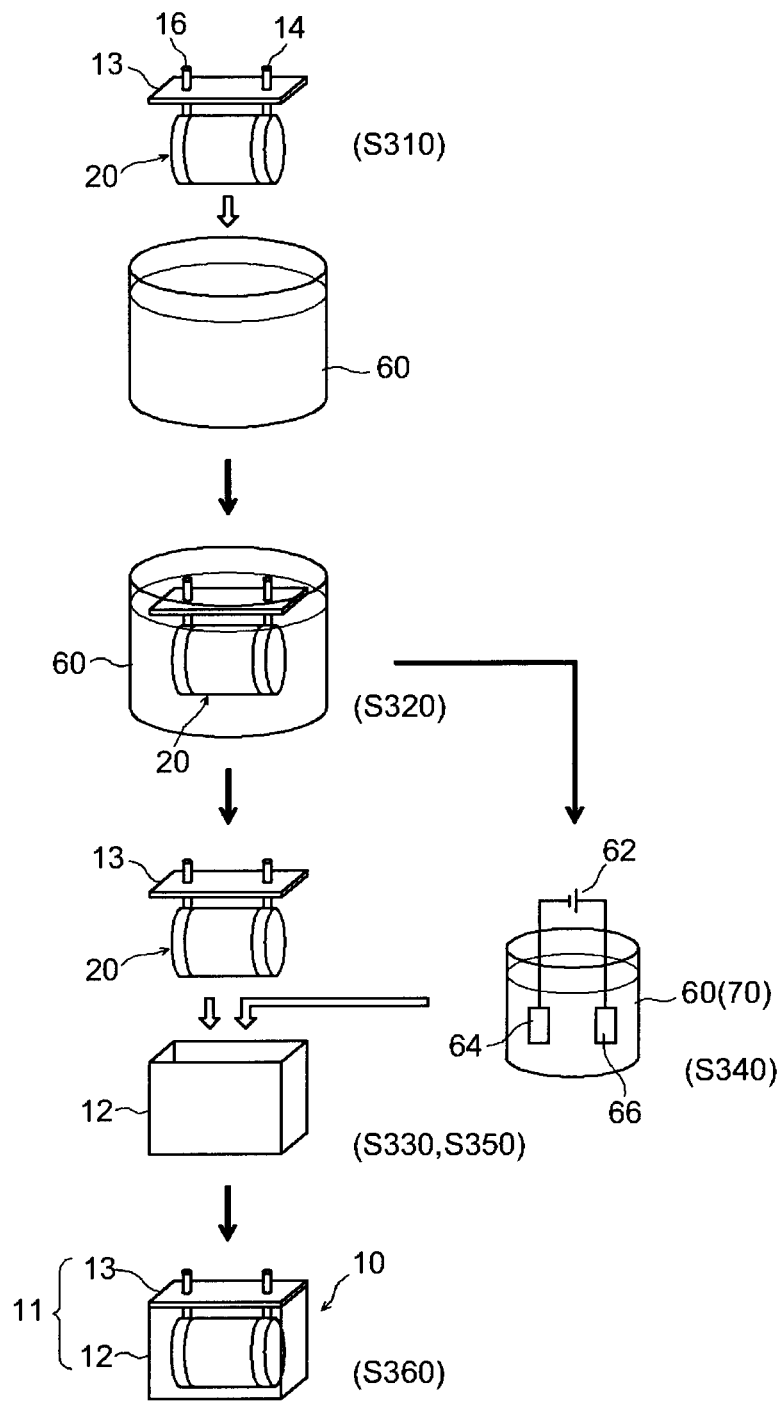
FIG. 8 is a diagram illustrating the key parts of a battery manufacturing method pertaining to Mode 3.

As shown in FIG. 8, the electrode assembly 20 is linked to the terminals 14 and 16 and the cover member 13 in the same manner as in Mode 1 above (step S310). This electrode assembly 20 is immersed in a nonaqueous liquid 60 obtained by dissolving $LiPO_6$ in the same kind of nonaqueous solvent as that of the nonaqueous electrolyte solution 70 used for the lithium ion secondary battery 10 to be manufactured in the same manner as in Mode 1 (step S320). Consequently, the water adsorbed to the wound electrode assembly 20 is moved into the nonaqueous liquid 60. After a specific immersion treatment time has elapsed, the electrode assembly 20 is taken out of the nonaqueous liquid 60. This immersion treated electrode assembly 20 is placed in a case 12 (step S330), and the case 12 and the cover member 13 are joined.

Meanwhile, the nonaqueous liquid 60 used for the above immersion treatment is subjected to the same voltage application treatment as in step S230 of Mode 2 (step S340). After this voltage application treatment, the nonaqueous liquid 60 is poured into the battery container 11 (step S350). That is, in this mode, after the nonaqueous liquid 60 that has undergone the above-mentioned voltage application treatment is subjected to voltage application treatment, it is utilized as the nonaqueous electrolyte solution 70 for the lithium ion secondary battery. After this, the electrolyte solution port is closed and the battery container 11 is sealed. This completes the construction (assembly) of a lithium ion secondary battery (battery assembly) 10 (step S360).

With this mode, water adsorbed to the wound electrode assembly 20 can be quickly and thoroughly removed by the above-mentioned immersion treatment, and in addition, the nonaqueous liquid 60 used for the immersion treatment can be effectively utilized as the nonaqueous electrolyte solution 70. Therefore, a battery 10 with a low water content and with which the amount of waste liquid is reduced and there is less environmental impact can be efficiently manufactured. Also, since the nonaqueous electrolyte solution 70 containing the $LiPO_2F_2$ produced by a reaction between water and $LiPF_6$ is poured into the battery container 11, there is a decrease in the potential of the electric double layer formed at the interface between the electrode active material layer and the nonaqueous electrolyte solution 70. This suppresses an increase in internal resistance, and allows the output of the battery 10 to be increased or maintained. If same the nonaqueous electrolyte solution 70 (prior to voltage application treatment) used in Mode 2 is used as the nonaqueous liquid 60 for the immersion treatment, for example, then the nonaqueous liquid 60 after the voltage application treatment may contain more $LiPO_2F_2$ due to the water that moved from the electrode assembly 20 into the nonaqueous liquid 60 as a result of the immersion treatment. With this mode, the effect of reducing the water content in the battery container 11 combines with the effect of $LiPO_2F_2$, and this synergistic effect allows a higher performance battery (a lithium ion secondary battery here) 10 to be manufactured efficiently.

Manufacturing examples related to the present invention will now be described, but these are not intended to limit the present invention to the specific examples given here.

Example 1

Lithium nickelate ($LiNiO_2$), polytetrafluoroethylene (PTFE), polyethylene oxide (PEO), and carboxymethyl cellulose (CMC) were combined in a weight ratio of 90:5:4:1 and mixed with water so that the solids concentration was 45 wt %, thereby preparing a water kneading type of positive electrode active material layer forming paste. Using aluminum foil with a length of 2 m, a width of 7 cm, and a thickness of 10 μm as a positive electrode collector, a specific region of the surface thereof was coated with the above-mentioned positive electrode active material layer forming paste and the coating was dried, which produced a positive electrode sheet in which a positive electrode active material layer was formed on both sides of a positive electrode collector.

Natural graphite, styrene butadiene rubber (SBR), and carboxymethyl cellulose (CMC) were combined in a weight ratio of 98:1:1 and mixed with water so that the solids concentration was 45 wt %, thereby preparing a water kneading type of negative electrode active material layer forming paste. Using copper foil with a length of 2 m, a width of 7 cm, and a thickness of 10 μm as a negative electrode collector, a specific region of the surface thereof was coated with the above-mentioned negative electrode active material layer forming paste and the coating was dried, which produced a negative electrode sheet in which a negative electrode active material layer was formed on both sides of a negative electrode collector.

Figure 5:
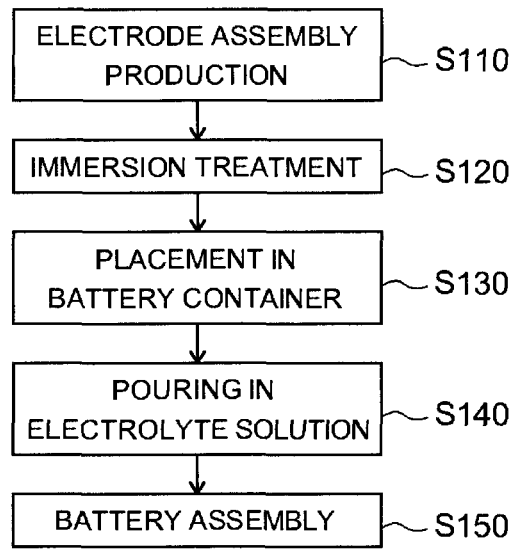
FIG. 5 is a flowchart of the key parts of a battery manufacturing method pertaining to Example 1.

The positive and negative electrode sheets thus obtained were used to produce a lithium ion secondary battery by the procedure shown in FIG. 5.

Specifically, the positive and negative electrode sheets produced above were laminated and wound with a porous polypropylene sheet (separator sheet) having a thickness of 30 μm, a width of 7.5 cm, and a length of 2 m, and then pressed and flattened to obtain a wound electrode assembly 20 with a flat shape (step S110). External connection terminals for the positive and negative electrodes were welded to the wound electrode assembly thus produced, and this product was immersed in 100 mL of dimethyl carbonate (DMC) used as a nonaqueous liquid (step S120). The immersion treatment time was approximately 1 hour. The immersion treated electrode assembly was lifted out of the DMC and placed in an aluminum box-shaped container having a shape corresponding to the electrode assembly (step S130).

Next, 50 mL of nonaqueous electrolyte solution was poured into this battery container (step S140). The nonaqueous electrolyte solution here was an electrolyte solution composition (water content of approximately 5 mg/50 mL) obtained by dissolving a supporting salt ($LiPF_6$ here) in a concentration of 1 mol/L in a mixed solvent of ethylene carbonate (EC) and dimethyl carbonate (DMC) with a 1:1 volumetric ratio. After this, the battery container was sealed to obtain a battery assembly (step S150).

Example 2

Figure 7:
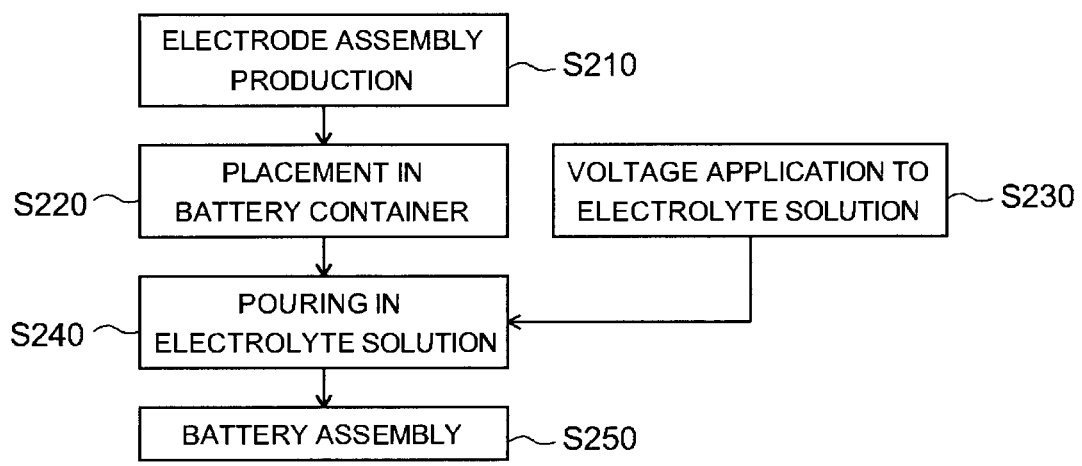
FIG. 7 is a flowchart of the key parts of a battery manufacturing method pertaining to Example 2.

In this example, a lithium ion secondary battery was produced by the procedure shown in FIG. 7, using positive and negative electrode sheets produced in the same manner as in Example 1.

Specifically, using the above-mentioned positive and negative electrode sheets, a wound electrode assembly was produced in the same manner as in step S110 of Example 1 (step S210). External connection terminals for the positive and negative electrodes were welded to the wound electrode assembly thus produced, and this product was placed in an aluminum box-shaped container having a shape corresponding to the electrode assembly (step S220).

Meanwhile, a pair of platinum electrodes (electrode plates) connected to an external power supply was inserted into an electrolyte solution composition (nonaqueous liquid) having the same composition as the nonaqueous electrolyte solution used in step S140 of Example 1, and a voltage of 2.5 V was applied (step S230). The voltage application time was 30 minutes. 50 mL of the composition (electrolyte solution) that had undergone this voltage application treatment was poured into the above-mentioned battery container (step S240) and the battery container was sealed to obtain a battery assembly (step S250).

Example 3

Figure 9:
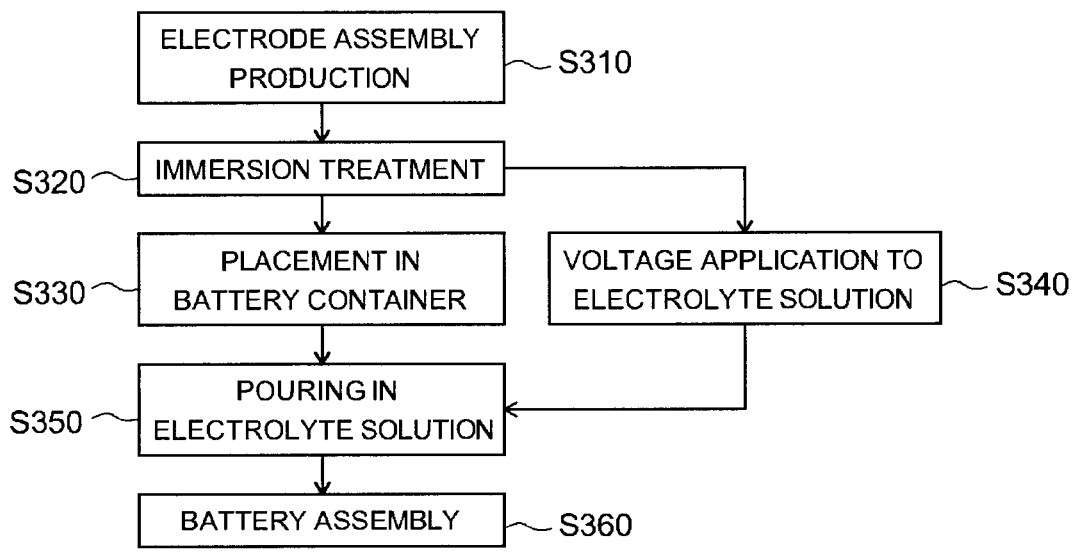
FIG. 9 is a flowchart of the key parts of a battery manufacturing method pertaining to Example 3.

In this example, a lithium ion secondary battery was produced by the procedure shown in FIG. 9, using positive and negative electrode sheets produced in the same manner as in Example 1.

Specifically, the above-mentioned positive and negative electrode sheets were used to produce a wound electrode assembly in the same manner as in step S110 of Example 1 (step S310). External connection terminals for the positive and negative electrodes were welded to the wound electrode assembly thus produced, and this product was immersed in 50 mL (water content of approximately 5 mg/50 mL) of an electrolyte solution composition (nonaqueous liquid) having the same composition as the nonaqueous electrolyte solution used in step S140 of Example 1 (step S320). The immersion treatment time was approximately 1 hour. After the above-mentioned immersion treatment time had elapsed, the electrode assembly was lifted out of the composition and placed in an aluminum box-shaped container having a shape corresponding to the electrode assembly (step S330).

Meanwhile, a pair of platinum electrodes joined to an external power supply was inserted into this composition in the same manner as in step S230 of Example 2, and a voltage of 2.5 V was applied (step S340). The voltage application time was 30 minutes. 50 mL of the composition (electrolyte solution) that had undergone this voltage application treatment was poured into the above-mentioned battery container (step S350) and the battery container was sealed to obtain a battery assembly (step S360).

Example 4

In this example, a lithium ion secondary battery was produced as follows, using positive and negative electrode sheets produced in the same manner as in Example 1.

Specifically, the above-mentioned positive and negative electrode sheets were used to produce a wound electrode assembly in the same manner as in step S110 of Example 1. External connection terminals for the positive and negative electrodes were welded to the wound electrode assembly thus produced, and this product was placed in an aluminum box-shaped container having a shape corresponding to the electrode assembly (the electrode assembly was not immersed in a nonaqueous liquid). Then, 50 mL of the same electrolyte solution as that used in step S140 of Example 1 (which had not undergone voltage application treatment) was poured into the above battery container. After this the battery container was sealed to obtain a battery assembly.

The secondary batteries produced in Examples 1 to 4 all have a theoretical capacity of 5 Ah.

Evaluation Test (1) Water Content Evaluation

In the course of manufacturing the lithium ion secondary batteries pertaining to Examples 1 to 4, the following method was used to measure the amount of water ($H_2O$) eluted into the electrolyte solution when part of the electrolyte solution was extracted from the battery container immediately after the electrolyte solution was poured into the battery container containing this electrode assembly. The results obtained with this method are given in Table 1 and FIG. 10, as the amount of water (mg) contained in the total amount (50 mL) of electrolyte solution included in the lithium ion secondary battery.

Water Content Measurement Method

A suitable amount of water was added to the extracted electrolyte solution (measurement sample), and a BTB indicator was further added. A sodium hydroxide (NaOH) aqueous solution of a suitable concentration was added dropwise until the color of this BTB indicator changed from yellow to green, and the amount of hydrogen fluoride (HF) contained in the measurement sample was measured from the dropping amount (neutral titration method). The amount of $H_2O$ consumed by the reaction with $LiPF_6$ was found on the basis of this HF amount (see Formula 1 above).

TABLE 1

| | Water content (mg/50 mL) |
|---|---|
| Example 1 | 122 |
| Example 2 | 175 |
| Example 3 | 101 |
| Example 4 | 198 |

Figure 10:
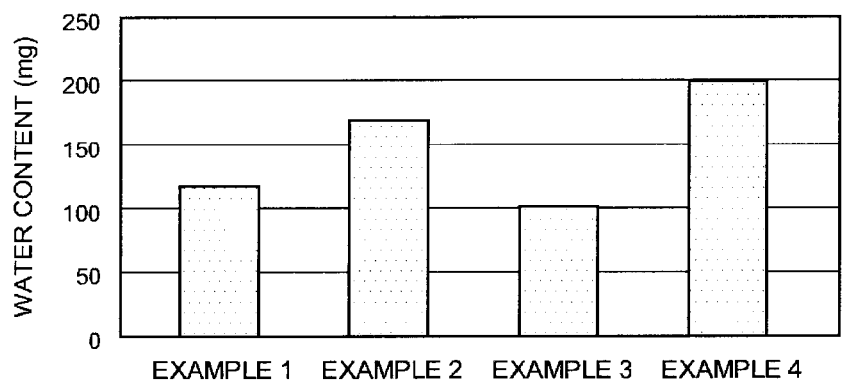
FIG. 10 is a graph of the amount of water in the secondary batteries manufactured in the examples.

As shown in Table 1 and FIG. 10, the water content in all of the battery containers with the batteries pertaining to Examples 1 to 3 was clearly reduced as compared to the battery pertaining to Example 4, which was manufactured without performing an immersion treatment or a voltage application treatment. In Examples 2 to 4, when an electrolyte solution composition with a higher water content was used, it is surmised that the effect of reducing the water content in the batteries manufactured with the methods of Examples 2 and 3 was much more apparent than with the battery manufactured using the method of Example 4.

(2) Output Characteristics Evaluation

The lithium ion secondary batteries obtained in Examples 2 to 4 were subjected to suitable conditioning (such as an initial charging/discharging treatment in which the battery was allowed to stand for 15 hours from the when the electrolyte solution was added, after which it was charged at a constant current up to 4.1 V at a charging rate of ⅒C, discharged at a constant current down to 3.0 V at a discharge rate of ⅓C, and then charged at a constant current and a constant voltage up to 4.1 V at a charging rate of ⅓C). The low-temperature (−30° C.) output was measured thereafter under the following conditions. The results thus obtained are given in Table 2.

Low-Temperature Output Measurement Conditions

Each of the lithium ion secondary batteries was adjusted to a 40% SOC (state of charge) by charging at a constant current and a constant voltage (CC-CV). Each battery was then discharged at a constant power (W) of 40 W, 60 W, 80 W, and 100 W, and the time it took from the start of discharge for the battery voltage to decrease to 3.602 V (discharge cut-off voltage) was measured (discharge seconds). The level of power (W) in the above-mentioned constant power discharge was plotted against the discharge seconds, and the power level was found at which the discharge seconds value was 2 seconds (that is, the output in discharge to 3.602 V in 2 seconds from an SOC of 40% at −30° C. This power level was termed the initial CP (constant power) at −30° C. for that battery.

TABLE 2

| | Low-temperature output (W) |
|---|---|
| Example 2 | 71 |
| Example 3 | 80 |
| Example 4 | 66 |

As shown in Table 2, the batteries of Examples 2 and 3 manufactured using an electrolyte solution composition that had undergone voltage application treatment exhibited an increase in low-temperature output as compared to the battery pertaining to Example 4, which was manufactured without undergoing this treatment. In particular, the increase in output was more pronounced in Example 3, in which the voltage application treatment was performed on the electrolyte solution composition used in the immersion treatment of the electrode assembly, than in Example 2. The reason for this seems to be that an electrolyte solution containing more $LiPO_2F_2$ was supplied (poured in) to the battery container in Example 3 than in Example 2. Therefore, when an electrolyte solution composition having a higher water content is used, it is surmised that the increase in output of a battery manufactured using the method of Example 2 will be more pronounced than in a battery manufactured using the method of Example 4.

The present invention was described in detail above, but it is not limited to the embodiments and examples given above, and the invention disclosed herein encompasses various changes and modifications to the specific examples given above.

INDUSTRIAL APPLICABILITY

With the secondary battery manufacturing method of the present invention, a secondary battery (such as a lithium ion secondary battery) in which the water content inside the battery container is kept low can be manufactured. A secondary battery such as this can be utilized in various applications because of its good battery performance (output characteristics, capacity maintenance characteristics, etc.), and is favorable as a secondary battery installed in a vehicle, for example. It is particularly favorable as a battery used as a battery used for a power supply for vehicles equipped with an electric motor, such as hybrid vehicles and electric vehicles.

The invention claimed is:

1. A method for manufacturing a lithium ion secondary battery comprising a nonaqueous electrolyte solution that contains a lithium salt in which fluorine is a constituent element and a battery container, said method comprising the steps of:

preparing an electrode assembly having positive and negative electrode sheets;

preparing a voltage-application cathode plate and a voltage-application anode plate;

immersing the electrode assembly into a nonaqueous liquid containing the lithium salt and a nonaqueous solvent;

taking out the electrode assembly from the nonaqueous liquid;

applying a voltage of at least 2 V to the nonaqueous liquid used in the immersion treatment by applying the voltage between the voltage-application cathode plate and the voltage-application anode plate inserted in the nonaqueous liquid, said voltage application treatment is conducted in a processing container which is different from the battery container and in the absence of the electrode assembly;

separating the nonaqueous liquid from the voltage-application cathode plate and the voltage-application anode plate after the voltage application treatment; and placing the nonaqueous electrolyte solution obtained using the nonaqueous liquid after the voltage application treatment in the battery container along with the electrode assembly.

2. The method according to claim 1, wherein the lithium salt is lithium hexafluorophosphate.

3. The method according to claim 1, wherein the same composition as the nonaqueous electrolyte solution is used as the nonaqueous liquid.

4. A vehicle comprising a lithium ion secondary battery manufactured by the method according to claim 1.

5. The method according to claim 1, wherein the voltage applied to the nonaqueous liquid is 2 to 3 V.

6. A method for manufacturing a lithium ion secondary battery comprising a nonaqueous electrolyte solution that contains a lithium salt in which fluorine is a constituent element and a battery container, said method comprising the steps of:

preparing an electrode assembly having positive and negative electrode sheets;

preparing a voltage-application cathode plate and a voltage-application anode plate;

immersing the electrode assembly into a nonaqueous liquid containing the lithium salt and a nonaqueous solvent;

taking out the electrode assembly from the nonaqueous liquid;

applying a voltage of at least 2 V to the nonaqueous liquid used in the immersion treatment by applying the voltage between the voltage-application cathode plate and the voltage-application anode plate inserted in the nonaqueous liquid such that HF produced by a reaction between $H_2O$ and the fluorine-containing lithium salt is electrolyzed to produce LiF precipitates on the surface of the voltage-application cathode plate, said voltage application treatment is conducted in a processing container which is different from the battery container and in the absence of the electrode assembly;

separating the nonaqueous liquid from the voltage-application cathode plate with the LiF and the voltage-application anode plate after the voltage application treatment; and placing the nonaqueous electrolyte solution obtained using the nonaqueous liquid after the voltage application treatment in the battery container along with the electrode assembly.

* * * * *